(12) United States Patent
Ozil

(10) Patent No.: US 6,255,658 B1
(45) Date of Patent: Jul. 3, 2001

(54) METHOD AND APPARATUS FOR LOCATING A POINT SOURCE OF RADIATION IN A CONTAMINATED SITE

(75) Inventor: Samuel Ozil, Rochefort du Gard (FR)

(73) Assignee: Delta Protection, Bagnols-sur-Ceze (FR)

( * ) Notice: Subject to any disclaimer, the term of this patent is extended or adjusted under 35 U.S.C. 154(b) by 0 days.

(21) Appl. No.: 09/084,956

(22) Filed: May 28, 1998

(30) Foreign Application Priority Data

May 28, 1997 (FR) .................................................. 97 06526

(51) Int. Cl.⁷ ............................ G01T 1/169; G01B 15/00
(52) U.S. Cl. ............................................ 250/394; 250/253
(58) Field of Search ...................................... 250/394, 253

(56) References Cited

U.S. PATENT DOCUMENTS

| 4,059,760 | * | 11/1977 | Murphy | ................................. | 250/253 |
| 5,045,700 | * | 9/1991 | Crowson et al. | ................. | 250/336.1 |
| 5,073,715 | * | 12/1991 | Chuiton et al. | ................. | 250/370.01 |
| 5,587,585 | * | 12/1996 | Eisen et al. | ..................... | 250/370.09 |

FOREIGN PATENT DOCUMENTS

| 0 542 561 | | 5/1993 | (EP) . |
| 61-170688 | * | 8/1986 | (JP) ..................................... 250/394 |

\* cited by examiner

*Primary Examiner*—Constantine Hannaher
(74) *Attorney, Agent, or Firm*—Jacobson Price Holman & Stern PLLC

(57) ABSTRACT

A person intervening on the site is fitted with a plurality of radioactivity meters (1, 2, 3, 4, 11, 12) distributed over the body at locations such that at least two meters receive radiation doses that are different due essentially to the screen constituted by the body of the intervener, and the radiation doses received simultaneously by the meters are compared to deduce therefrom information concerning the direction towards the source relative to the intervener.

16 Claims, 2 Drawing Sheets

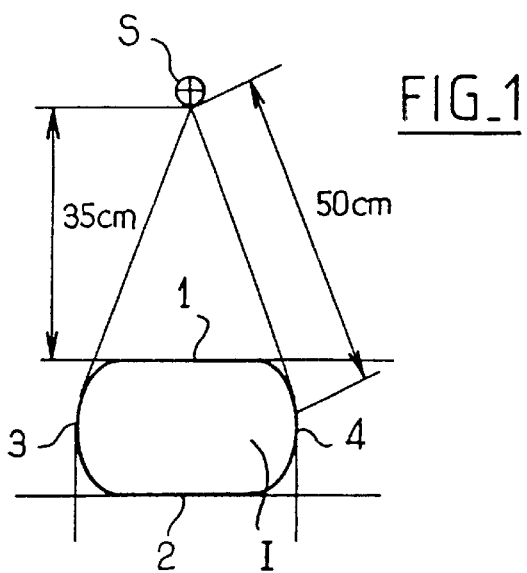
FIG_1
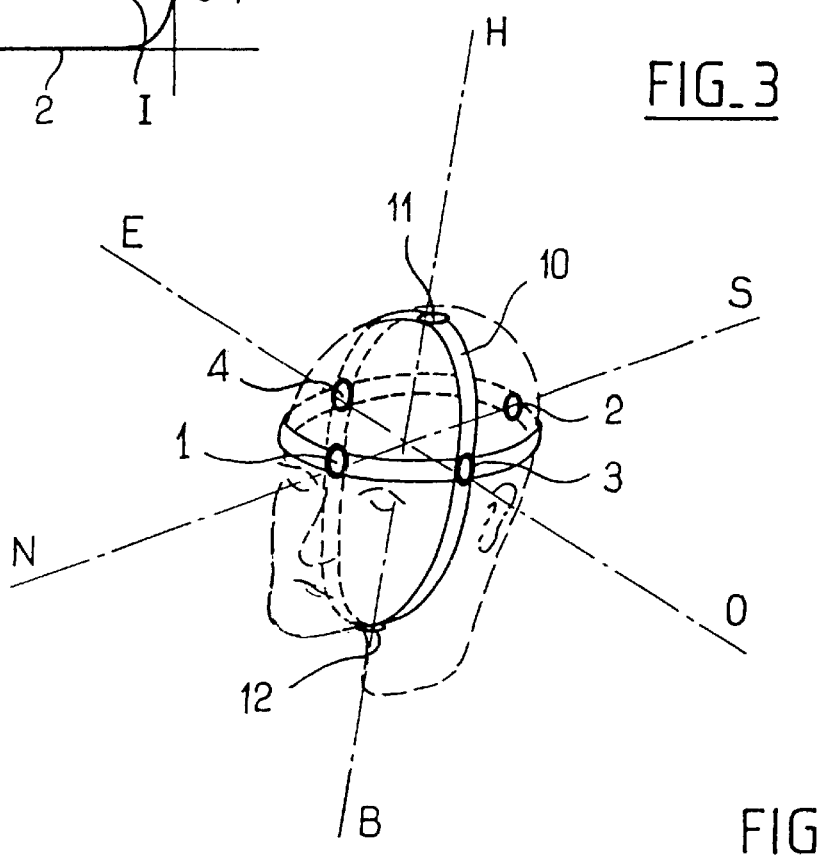
FIG_3
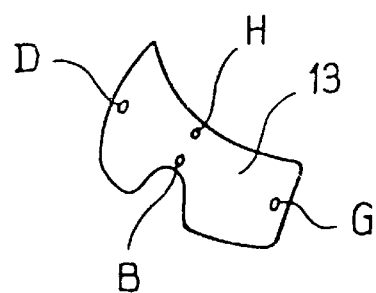
FIG_4

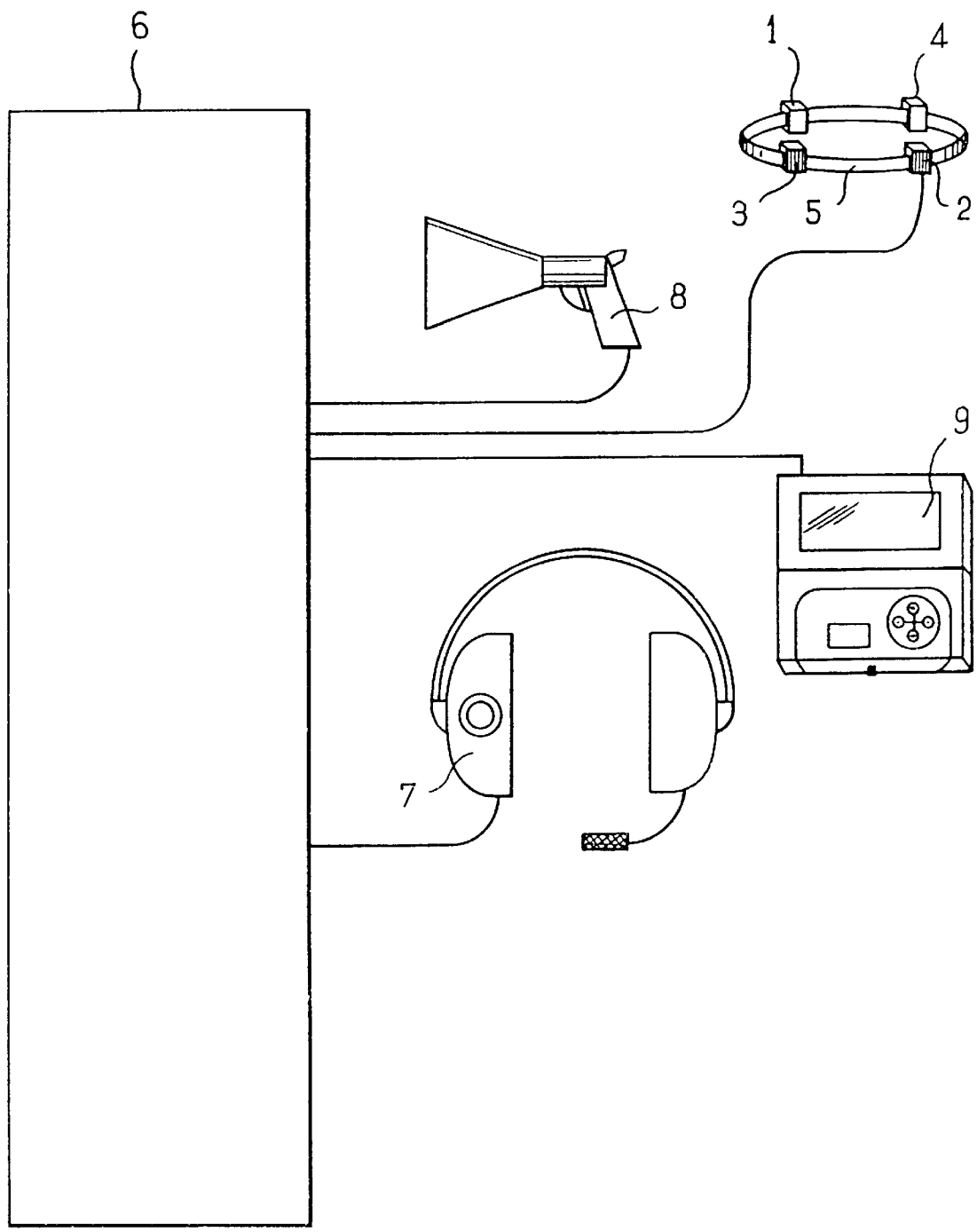
FIG_2

METHOD AND APPARATUS FOR LOCATING A POINT SOURCE OF RADIATION IN A CONTAMINATED SITE

The invention relates to locating a point source of radiation in a contaminated site.

It is known to attempt to locate a source of radiation by displacing a radiation-sensitive meter in a contaminated site and by relying on variations in the value representative of the dose of radiation received by the meter.

That technique is not very accurate and can require an unacceptable length of time to be spent in the place being searched, particularly if the search is a first search in said place using protection equipment that may be rudimentary.

Publication EP 0 542 561 describes source-locating apparatus comprising a vehicle fitted with a directional radiation meter used in combination with an omnidirectional meter.

The present invention seeks to provide a method and apparatus that are simple, that make use of a person intervening on the site as a vehicle, and that enable that person to determine quickly the direction of a source even though the equipment has omnidirectional meters only.

According to the invention, a person intervening on the site is fitted with a plurality of radioactivity meters distributed over the body at locations such that at least two meters receive doses of radiation that differ essentially because of the screen constituted by the body of the intervener, and the radiation doses that are received simultaneously by the meters are compared to deduce therefrom information concerning the direction of the source relative to the intervener.

In particular implementations, one or more of the following characteristics are implemented:

the meters are distributed in a horizontal plane;

the intervener is provided with four meters around a vertical axis such that seen from said axis, the meters are located in pairs in opposite directions and in pairs in orthogonal directions;

the meters are placed so as to be disposed symmetrically in pairs about a vertical axis around which the intervener can turn on himself;

the signals from the meters are applied to a center external to the site for collection and processing purposes;

the intervener is continuously informed about the doses received simultaneously by the meters; and the indication is visible.

The present invention also seeks to provide apparatus that is simple, suitable for being worn by an intervener, and for enabling that person to locate quickly and accurately the direction of a point source of radiation.

According to the invention, the apparatus essentially comprises a plurality of meters responsive to the radiation from the point source and suitable for delivering electrical signals corresponding to the doses of radiation received by the meters, means for distributing the meters over the body of the intervener so that they are located in determined relative positions and separated from one another by the body of the intervener, and means connected to the meters to receive the electrical signals from the meters and to transform them into information enabling the intervener to look towards the source.

In a preferred embodiment, the apparatus comprises meters in a horizontal plane, and even more advantageously, it comprises meters distributed in a horizontal plane around the body of the intervener and meters situated respectively above the head and below the chin.

In a typical embodiment, the meters are mounted on a waist belt or on a piece of the intervener's clothing, and/or on a head harness.

The means for receiving and processing signals from the meters are carried by the intervener or are situated remotely and are connected to the intervener via an electrical or a radio link.

The information-supplying means enabling the intervener to look towards the source preferably comprise visible means or audible means.

The visible means may be constituted, for example, by a screen placed in front of the eyes of the observer so as to be able to follow the movements of the observer's head and presenting zones representative of the relative distributions of the meters, and on which indications are displayed representative of the doses received by the meters.

Such indications may be digits, letters, graphics, colors.

The information from the meters may be used for purposes other than processing to enable the intervener to locate the source, for example the information may be recorded.

Two embodiments of apparatus of the invention are described below with reference to the figures of the accompanying drawings, in which:

FIG. 1 is a theoretical diagram of a first embodiment;

FIG. 2 is a block diagram of an apparatus including an implementation of the type shown in FIG. 1;

FIG. 3 is a theoretical diagram of a second embodiment; and

FIG. 4 is a diagrammatic view of a visor enabling the intervener to look in a particular direction as a function of the indications from the meters.

The diagram shown in FIG. 1 is a horizontal section through the belt of an intervener on which there are shown four omnidirectional Geiger-Müller (GM) counters mounted in pairs in opposition and in quadrature.

Well-known Geiger-Müller counters are used which are obtainable in sizes that can easily be fitted to the intervener.

If contamination is uniform, then all four detectors will respond in the same manner, whereas if the source of contamination is a point source (S), then the counters will respond differently depending on their positions relative to the source.

EXAMPLE

It was assumed that a standard intervener is 40 cm wide and 27 cm thick. Calculation shows that small size differences compared with a standard person have little effect on the results. There is nothing to prevent using a formula in the program so as to create a standard.

A cobalt 60 source providing 0.1 Ci in a 1 cm thick metal tube that was used as a reference. In practice, the mixture of sources encountered during stoppages have a mean gamma count that is considerably lower, which will generate a differential ratio that is considerably greater.

At 35 cm from the source, the intervener was assumed to be positioned in front of the source (a rational position for a workstation), and the dose rate indicated by GM counter 1 was 887 mRem/h. The dose rate given by GM counter 2 on the intervener's back, i.e. 62 cm away from the source, was 135 mRem/h. The difference between those two rates is due to distance and above all to the 27 cm of human body. At 62 cm in air, the dose rate was 289 mRem/h.

The dose rates measured by the GM counters 3 and 4 positioned on the sides, i.e. at 50 cm from the source, were 441 mRem/h.

|  | 0.1 Ci<br>Co 60<br>source | 0.1 Ci<br>combination<br>source |
| --- | --- | --- |
| Dose rate at 7 cm from point source | 14.2 mRem/h | 10.5 mRem/h |
| Dose rate of 35 cm from point source | 887 mRem/h | 520 mRem/h |
| Dose rate at wearer's back, i.e. 62 cm from source | 135 mRem/h | 75 mRem/h |
| Dose rate on agent's side, i.e. at 50 cm | 441 mRem/h | 259 mRem/h |
| Dose rate at 63 cm in air | 289 mRem/h | 170 mRem/h |

By comparing the indications given by the counters, it is possible to determine the vertical plane containing the source relative to the intervener. This determination can be performed by a computer, but in a simpler embodiment, it suffices for the intervener to move and/or turn until the side counters 3, 4 give the same reading while the front and back counters 1, 2 give a maximum reading and a minimum reading, in which case the intervener knows that the configuration is as shown in FIG. 1 and the source is directly in front of the intervener.

If, as shown in the embodiment of FIG. 3, two additional sensors are also provided situated at opposite ends of a vertical axis associated with the head, then it is possible for the intervener to look directly at the position of the source by raising or lowering the head until those two counters also provide identical readings. By fitting the intervener with a video camera placed on the head, it is possible to follow from a distance and to record continuously what the intervener is looking at while simultaneously reading the doses received by the counters.

The above theoretical considerations assume that the source is a point source, that the body of the intervener is completely symmetrical about its own axis, and that the head of the intervener can be assumed to be a sphere.

The system can be calibrated to take account of possible asymmetry or this can be taken into account in the computer.

FIG. 2 is a diagram of a set of equipment operating on the basis of a belt 5 having four omnidirectional Geiger-Müller counters.

The readings provided by the counters are sent to the computer 6 which processes the readings provided by the counters so as to evaluate the direction of the source, and the computer or an operator sends corresponding information to the intervener via a video and audio helmet 7 worn by the intervener, thereby enabling the intervener to be guided orally to look in the direction in which the source is to be found relative to the intervener.

The system may be associated with auxiliary equipment, in particular a video and dosemeter gun 8 held by the intervener and connected to the computer, and by a portable video recorder 9.

The gun makes it possible to read in video the labels marking the equipment towards which the intervener points it, to measure the dose rate at a few centimeters from said equipment, and to have a dosemeter reference for the equipment.

The video recorder carried by the intervener serves to record data from the dosemeter belt and from the gun in order to make a posteriori analysis of operations possible.

FIG. 3 shows a variant embodiment in which the intervener is fitted with a head harness 10 carrying firstly four omnidirectional counters 1, 2, 3, and 4 organized in opposing pairs and in quadrature pairs and all situated in a plane perpendicular to the vertical axis of the head (assuming the head is held upright) at a level between the nose and the forehead, plus two other omnidirectional counters 11, 12 situated on the said vertical axis, respectively on top of the head and under the chin.

As in FIG. 2, the counters can be connected to a remote computer which responds to the readings provided by the counters to determine information about the direction to the source relative to the intervener, and to send said information to the intervener or to an operator.

In a variant, the counters are connected to a visor (FIG. 4), for example, which visor has four zones, respectively a left zone and a right zone (G, D) and a top zone and a bottom zone (H, B) which are provided with means suitable for providing visible indications representative of the doses respectively received by the two counters in one or other of the pairs of counters that are aligned in pairs 1, 2, 3, 4, and of the doses received by the counters 11 and 12.

The intervener is looking towards the source when the readings provided at (G) and at (D) are identical to each other and when the readings provided at (H) and at (B) are likewise identical to each other.

The invention is not limited to these embodiments.

What is claimed is:

1. A method of locating a point source of radioactivity in a contaminated site, in which a person intervening on the site is fitted with a plurality of radioactivity meters distributed over the body at locations such that at least two meters receive doses of radiation that differ essentially because of the screen constituted by the body of the intervener, four radioactivity meters being placed around a vertical axis such that seen from said axis, the meters are located in pairs in opposite directions, with each pair orthogonal to the other, the radiation doses that are received simultaneously by the meters being compared to deduce therefrom information concerning the direction of the source relative to the intervener such that the direction of the source relative to the intervener is determined by the intervener turning about the vertical axis until each meter of one pair of meters gives a maximum reading and a minimum reading, respectively, and the other pair of meters give a substantially same reading, the direction of the source being that direction corresponding to the meter giving the maximum reading.

2. The method according to claim 1, in which the four radioactivity meters are placed in a horizontal plane around the body of the intervener.

3. The method according to claim 2, further comprising the steps of placing two additional radioactivity meters above the head and below the chin of the intervener, respectively, and raising and lowering, by the intervener, the head to determine an elevation of the source using said two additional meters.

4. The method according to claim 1, in which the signals from the meters are sent to a center outside the site for collection and processing purposes.

5. The method according to claim 4, in which the doses received simultaneously by the meters are continuously indicated to the intervener.

6. The method according to claim 5, in which said indication is visible.

7. An apparatus for locating a point source of radiation in a contaminated site relative to a person intervening on the site, the apparatus comprising a plurality of meters responsive to the radiation from the source and suitable for delivering electrical signals corresponding to the doses of radiation received by the meters, means for distributing the meters over the body of the intervener so that the meters are located in determined relative positions and separated from one another by the body of the intervener, a computer connected to the meters to receive the electrical signals from the meters and to transform said signals into information enabling the intervener to turn towards the source, and a device carried by the intervener and connected to the computer for providing the information from the computer to the intervener so that the intervener can act in accordance with the information provided.

8. The apparatus according to claim 7, in which the apparatus includes four meters distributed in a horizontal plane around the body of the intervener.

9. The apparatus according to claim 8, in which the four meters distributed in a horizontal plane are located in pairs in opposite directions, with each pair orthogonal to the other, about a vertical axis of the intervener's body, the direction of the source relative to the intervener being determined by turning at least one of the head and the body of the intervener about the vertical axis until one pair of meters distributed on the horizontal plane give a maximum reading and a minimum reading and the other pair of meters give a substantially same reading, the direction of the source in the horizontal plane being that direction corresponding to the meter giving the maximum reading.

10. The apparatus according to claim 9, in which said means for distributing includes a waist belt.

11. The apparatus as set forth in claim 8, further comprising two additional meters situated on a vertical axis of the intervener for determining an elevation of the source.

12. The apparatus according to claim 7, further comprising a head harness (10) fitted with four meters distributed in a horizontal plane perpendicular to the axis of the head of the intervener when held vertical, the four meters being placed around the vertical axis of the intervener such that seen from said axis, the meters are located in pairs in opposite directions, each pair orthogonal to the other, the direction of the source relative to the intervener being determined by turning at least the head of the intervener about the vertical axis until one pair of meters distributed on the horizontal plane give a maximum reading and a minimum reading and the other pair of meters give a substantially same reading, the direction of the source in the horizontal plane being that direction corresponding to the meter giving the maximum reading.

13. The apparatus as set forth in claim 12, further comprising two additional meters situated on said vertical axis, one on top of the head and the other beneath the chin of the intervener, wherein upon determining the direction of the source in the horizontal plane and looking in that direction, the intervener, by raising and lowering of the head until the meters situated on said vertical axis give a substantially same reading, can determine an elevation of the source.

14. The apparatus according to claim 7, in which the meters are omnidirectional.

15. The apparatus according to claim 7, and further comprising a screen placed in front of the eyes of the intervener so as to follow movement of the intervener's head, said screen having zones representing the relative dispositions of the meters and on which there are displayed indications representative of the doses of radiation being received by the meters.

16. The apparatus as set forth in claim 7, wherein the device carried by the intervener is a headset.

* * * * *